3,066,175
METHOD FOR THE DEFLUORINATION OF
REACTION PRODUCTS
Robert D. Bauer, and Charles C. Chapman, Bartlesville, Okla., assignors to Phillips Petroleum Company, a corporation of Delaware
Filed Mar. 11, 1960, Ser. No. 14,392
13 Claims. (Cl. 260—683.48)

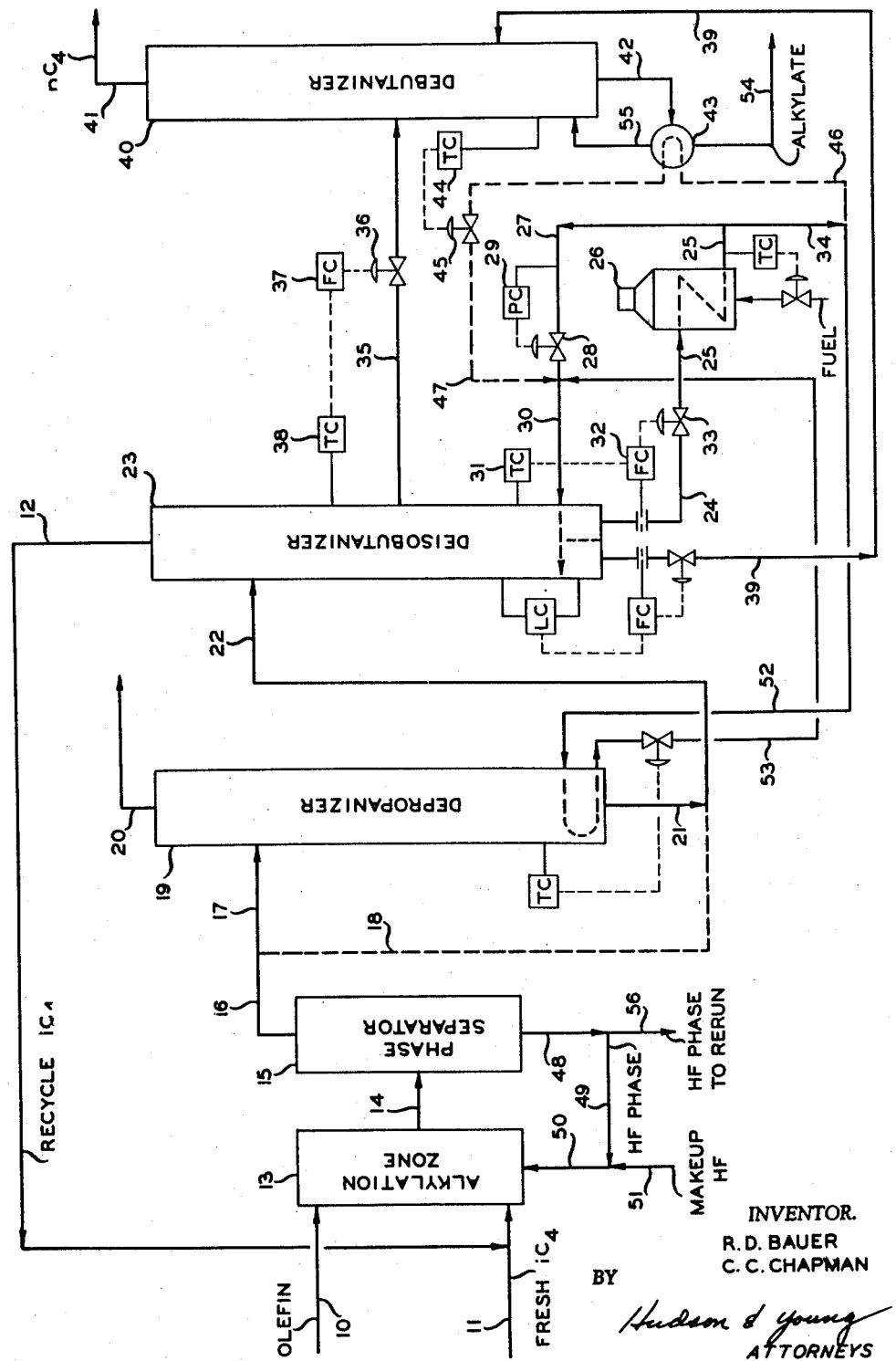
Nov. 27, 1962  R. D. BAUER ET AL  3,066,175
METHOD FOR THE DEFLUORINATION OF REACTION PRODUCTS
Filed March 11, 1960
INVENTOR.
R. D. BAUER
C. C. CHAPMAN
BY
Hudson & Young
ATTORNEYS United States Patent Office 3,066,175
Patented Nov. 27, 1962

This invention relates broadly to the defluorination of organic fluorine compounds present in effluents from the conversion of hydrocarbons utilizing hydrofluoric acid as a catalyst. In accordance with one aspect, this invention relates to the defluorination of the effluent from an HF alkylation reaction. In accordance with another aspect, this invention relates to an improved process for defluorinating an HF alkylation effluent being subjected to deisobutanization. In accordance with another aspect, this invention relates to a fractionation reboiler operation. In accordance with still another aspect, this invention relates to a process for heating HF alkylation effluent deisobutanizer bottoms to cause thermal defluorination of same and controlling such an operation as herein set forth and described.

Concentrated or substantially anhydrous hydrofluoric acid is used as a catalyst in numerous organic reactions. Hydrofluoric acid is particularly useful as a catalyst in the alkylation of olefins and isoparaffins. The reaction products from alkylation, for example, are generally passed to a settling zone for separation into a liquid hydrocarbon phase and a liquid acid phase. The hydrocarbon phase recovered from the settling zone is generally subjected to fractional distillation to remove hydrogen fluoride dissolved therein as well as separate the product into several desired fractions. This invention is primarily concerned with the removal of hydrogen fluoride from the hydrocarbon phase and defluorination of the alkylate fraction recovered from fractionation.

In thermally defluorinating the bottoms product from an isobutane removal column, for example, a problem of great concern is often encountered when the bottoms product contains an appreciable amount of normal butane and/or pentanes. These relatively light hydrocarbons result in (1) a high coil vaporization and the attendant high pressure drop and (2) lower coil outlet temperature or operation of the furnace coil under higher pressure to suppress vaporization and obtain the desired temperature for defluorination. Another problem often encountered in thermal defluorination is that the time (circulation rate through the fired heater) and temperature (reboiler heater outlet) are directly controlled by the amount of reboil duty required by the isobutane removal column.

While this invention will now be described more fully and in more detail as it applies to thermal defluorination of HF alkylate deisobutanizer bottoms it will be understood by one skilled in the art in possession of this disclosure that there is provided a general physical method of operation or a combination fractionation-heating operation which possesses general application.

Accordingly, it is an object of this invention to provide an improved operation of a fractionation zone in conjunction with a heating zone.

Another object of this invention is to provide an improved process for thermal defluorination of HF alkylation effluent deisobutanizer bottoms.

Still another object of this invention is to provide a process for defluorination in an alkylation process which results in an increase in recovery of the hydrofluoric acid catalyst.

A further object of this invention is to provide a process for thermal defluorination of HF alkylation effluent deisobutanizer bottoms wherein higher circulation rates and temperatures on the stream undergoing thermal defluorination is obtained.

Other aspects, objects, as well as the several advantages of the invention are apparent from a study of the disclosure, the drawing and the appended claims.

In accordance with one concept of the present invention, a liquid hydrocarbon fraction containing organic fluorine compounds, for example, an alkylation effluent, recovered from a fractionation zone is passed through a heating zone wherein the temperature of at least a portion of said fraction is increased sufficiently to decompose said organic fluorine compounds, at least a portion of said heated fraction is returned directly to said fractionation zone, and a vaporous side stream from said fractionation zone is withdrawn to remove light materials present in said heated fraction. By so operating, the thermal defluorination is materially improved by increasing the bubble point of the liquid hydrocarbon fraction heated so that said fraction can be heated to a higher temperature, without the above noted limitations, and thus undergo a higher degree of thermal defluorination.

In accordance with another concept of the present invention, a liquid hydrocarbon fraction containing organic fluorine compounds, for example, an alkylation effluent, recovered from a fractionation zone, is passed to a heating zone wherein the temperature of at least a portion of said fraction is increased sufficiently to decompose organic fluorine compounds, at least a portion of said heated fraction is heat exchanged with a cooler stream to supply reboiling heat for another fractionation zone, for example, and cooled and uncooled hydrocarbon is returned to said first fractionation zone. By operating in accordance with the above concept, higher circulation rates and temperatures on the fraction undergoing thermal defluorination can be obtained. This improvement in thermal defluorination, as exemplified by reduced losses of HF acid and less product treating cost, is accomplished in our process by (1) increased time (greater circulation) and (2) higher possible temperatures.

As will become evident upon a further study of the invention described hereinafter, either of the above disclosed expedients can be employed alone or they can be employed in combination to obtain the improved thermal defluorination. As noted above also, the present invention is particularly applicable to improving the thermal defluorination of an HF alkylation effluent deisobutanizer bottoms stream.

A better understanding of our invention will be obtained upon reference to the accompanying schematic drawing which illustrates both concepts of our invention employed in an HF alkylation process.

Referring now to the drawing, an olefin charge composed essentially of butylenes and some propylene is passed by way of pipe 10 to alkylation zone 13. Fresh isobutane in pipe 11 and recycle isobutane in conduit 12 are also introduced into alkylation zone 13 wherein, under usual alkylation conditions, alkylation ensues. Hydrofluoric acid catalyst is introduced to alkylation zone 13 by way of pipes 51 and 50. Recycle hydrofluoric acid is introduced into conduit 50 by way of pipes 48 and 49. A portion of recycled HF acid is passed to a rerun unit, not shown, by way of pipe 56. The product-emulsion formed in zone 13 is passed to conventional settler or separator 15 by way of pipe 14. The acid phase is removed and recovered via line 48 and returned by pipes 49 and 50 to alkylation zone or contactor 13.

The hydrocarbon phase recovered in separator 15 is passed by way of pipes 16 and 17 to depropanizer 19, the overhead of which is removed by way of pipe 20. The bottoms stream is removed from fractionator 19 by way of conduit 21. If desired, a portion of the hydrocarbon phase removed from separator 15 need not be subjected to depropanization and can bypass fractionator 19 by way of conduit 18. This operation is disclosed and claimed in copending application Serial No. 14,391, filed March 11, 1960, of Robert D. Bauer.

From the depropanizer, bottoms are removed by pipe 21 and passed to deisobutanizer 23 by way of conduit 22. Isobutane and lighter materials are removed overhead from deisobutanizer 23 by way of pipe 12 and recycled to alklation zone 13. Bottoms from deisobutanizer 23 containing normal butane and alkylate is removed by conduit 24. A portion of the deisobutanizer bottoms is passed through conduit 25, control valve 33 and introduced into fired heater 26 wherein the temperature of the bottoms fraction is increased sufficiently to decompose organic fluorine compounds present and to impart to this fraction a quantity of heat above that required to reboil deisobutanizer 23. The bottoms fraction is heated in heater 26 to a temperature within the range of about 325 to about 550° F., preferably between about 375 and about 475° F.

In accordance with one concept of our invention, a portion of the bottoms fraction heated in heating zone 26 is returned directly to deisobutanizer 23 by way of conduits 27 and 30. Pressure controller 29, controlling valve 28, maintains the desired pressure in the coil of furnace 26. The remainder of the heated bottoms fraction not returned directly to the isobutanizer 23 is passed by way of conduits 34 and 52 to depropanizer 19 to serve as reboiler heat. The partially cooled bottoms stream is returned from depropanizer 19 by way of conduits 53 and 30 to deisobutanizer 23.

Optionally, but nevertheless, as an important feature of present invention, at least a portion of the heated bottoms in conduit 34 can be passed by way of pipe 46 shown in dotted lines and passed to reboiler 43. The partially cooled stream is returned from reboiler 43 by way of control valve 45, conduit 47 and pipe 30 and introduced into deisobutanizer 23 as previously described. Control valve 45 is regulated by temperature controller 44 which senses the temperature in debutanizer 40.

In accordance with one concept of our invention, a vaporous side stream comprising normal butane primarily is removed from an intermediate portion of deisobutanizer 23 by way of conduit 35 and passed to debutanizer 40. The amount of vaporous withdrawal is controlled by temperature or analytical controller 38, flow controller 37 and control valve 36.

The remaining portion of the bottoms fraction removed from deisobutanizer 23 not passed to heated 26 is passed by way of conduit 39 directly to debutanizer 40. A normal butane stream is recovered overhead from debutanizer 40 by way of conduit 41. A bottoms alkylate product is removed from debutanizer 40 by way of conduit 42 and passed to reboiler 43, and a portion returned to debutanizer 40 by way of conduit 55. Alkylate product is removed from the process by way of conduit 54.

In actual operation, by removing a portion of the vaporous light materials from an intermediate portion of deisobutanizer 23 by way of conduit 35 the bubble point of the deisobutanizer bottoms passed through heater 26 is increased and therefore the bottoms stream can be heated to a higher temperature and thereby undergo a higher degree of thermal defluorination. Also, by cooling at least a portion of the effluent from heating zone 26, as shown, higher circulation rates and temperatures on the deisobutanizer bottoms stream being heated can be obtained thereby improving thermal defluorination.

Assuming feed to tower 23 to increase at a constant quality, the tower bottom temperature will begin to lower. This, via temperature controller 31, will actuate flow controller 32 to effect further opening of valve 33, which, in turn, increases the amount of bottoms fed to heater 26. As additional bottoms material is passed through furnace 26, additional fuel is charged to the furnace in response to the furnace effluent temperature, and additional vaporization of liquid takes place in heater 26. The amount of heat imparted to the bottoms fraction passed through the heater will be more heat than required for reboiler heat in deisobutanizer 23. The additional heat present in the effluent from furnace 26 is advantageously used as reboiler heat in either depropanizer 19 or debutanizer 40, as shown. A vaporous side stream comprising essentially normal butane is removed by conduit 35. The amount of normal butane removed from deisobutanizer 23 is controlled by temperature controller 38 which senses the column temperature. The column temperature will vary depending upon the amount of vaporous material returned by conduit 30 and condensed in column 23 to give up its latent heat.

The following is a specific example of operation according to the above description.

In a specific example using our process, the contactor 13 is operated at 90° F., and a pressure sufficient to maintain a liquid phase. The isobutane to olefin mole ratio is 5:1, and the weight ratio of hydrocarbon to catalyst is 1:1. Each barrel of olefin reacts with 1.3 barrels of isobutane to produce 1.7 barrels of total alkylate. The olefin stream 10 is introduced at 90° F., the recycle acid at 90° F. and the isobutane at 90° F. The phase separator is operated at 90° F., and pressure to maintain liquid phase.

Following are the conditions of pressure and temperature obtained in the depropanizer, the deisobutanizer, and the debutanizer.

|  | Depropanizer Column 19 | Deisobutanizer Column 23 | Debutanizer Column 40 |
| --- | --- | --- | --- |
| Top pressure p.s.i.g | 285 | 115 | 85 |
| Top temperature, °F | 136 | 140 | 143 |
| Bottom pressure p.s.i.g | 290 | 120 | 90 |
| Bottom temperature, °F | 233 | 275 | 336 |

NOTE.—Fired heater 26: outlet pressure, 340 p.s.i.g.; outlet temperature, 425° F.

In the following table, the composition of the various flow streams shown on the drawing are tabulated.

Table

| Stream No | 10 | 11 | 12 | 16 | 17 | 18 | 21 | 22 | 39 |
|---|---|---|---|---|---|---|---|---|---|
| Stream B/D component | Olefin charge | Fresh isobutane | Recycle isobutane | Reactor hydrocarbon effluent | Charge to depropanizer | Portion to isobutane stripper | Depropanizer bottoms | Charge to isobutane stripper | Isobutane bottom yield |
| $C_3^=$ | 1,845 | | | | | | | | |
| $C_3$ | 1,221 | 50 | 2,520 | 3,976 | 1,533 | 2,443 | 77 | 2,520 | |
| $C_4^=$ | 2,885 | | | | | | | | |
| $iC_4$ | 2,277 | 4,072 | 41,023 | 41,225 | 15,897 | 25,328 | 15,875 | 41,203 | 20 |
| $nC_4$ | 1,757 | 175 | 6,613 | 8,545 | 3,295 | 5,250 | 3,295 | 8,545 | 332 |
| $iC_5$ | 95 | 100 | 250 | 855 | 330 | 525 | 330 | 855 | 587 |
| LA | | | 20 | 7,660 | 2,954 | 4,706 | 2,954 | 7,660 | 7,638 |
| HA | | | | 405 | 156 | 249 | 156 | 405 | 405 |
| HF | | | 221 | 359 | 138 | 221 | (¹) | 221 | (²) |
| Total | 10,080 | 4,397 | 50,647 | 63,025 | 24,303 | 38,722 | 22,687 | 61,409 | 8,982 |

| Stream No | 24 | 27 | 52 | 30 | 35 | 20 | 41 | 54 |
|---|---|---|---|---|---|---|---|---|
| Stream B/D component | Isobutane bottom to furnace | Direct Furnace effluent to isobutane stripper | Furnace effluent to propanizer tower | Total to reboil deisobutanizer column | Side draw | Depropanizer overhead yield | Debutanizer overhead yield | Debutanizer alkylate yield |
| $C_3^=$ | | | | | | | | |
| $C_3$ | | | | | | 1,456 | | |
| $C_4^=$ | | | | | | | | |
| $iC_4$ | 180 | 122 | 58 | 180 | 160 | 22 | 180 | |
| $nC_4$ | 2,988 | 2,032 | 956 | 2,988 | 1,600 | | 1,842 | 90 |
| $iC_5$ | 5,283 | 3,593 | 1,690 | 5,283 | 18 | | | 605 |
| LA | 68,742 | 46,745 | 21,997 | 68,742 | 2 | | | 7,640 |
| HA | 3,645 | 2,479 | 1,166 | 3,645 | | | | 405 |
| HF | (¹) | (¹) | (¹) | (¹) | | 138 | (²) | (²) |
| Total | 80,838 | 54,971 | 25,867 | 80,838 | 1,780 | 1,616 | 2,022 | 8,740 |

¹ Not measureable as barrels, present as p.p.m. fluorides.  ² Negligible fluorides.

These tabulated data illustrate a specific operation in accordance with our invention. The maximum normal butane and lighter in the isobutane removal column bottoms should be no greater than about 25 volume percent; preferably no greater than about 4 to 5 volume percent.

The utilization of a portion of the furnace effluent to heat auxiliary equipment advantageously increases the residence time for defluorination of the isobutane removal column bottoms, effecting, in this example, about 10 percent additional organic fluorine compound destruction.

The side draw is usually a vapor draw to increase the quantity of normal butane therein.

Among the advantages of operating according to this specific example of our invention as compared to the prior art and methods of thermally defluorinating the hydrocarbon fraction containing organic fluorine compounds are increased defluorination of the alkylate product with additional recovery of HF catalyst requiring substantially no subsequent treatment (e.g. bauxite treatment) of the product; and returning to the isobutane removal column only that quantity of reboil heat required for optimum operation of the column.

It will be understood by one skilled in the art in possession of this disclosure that the drawing is essentially schematic in character and that certain pieces of equipment and/or details thereof have been omitted for the sake of simplicity. Such details will be routinely supplied by one skilled in the art in possession of this disclosure. Furthermore, detail conditions of operation as they may apply to certain embodiments of the invention which can be routinely supplied by one skilled in the art, have not been herein elaborated also for sake of simplicity.

Although this invention has been described in relation to an operation wherein the primary fractionator is a deisobutanizer, it is to be understood that said fractionator can also be a partial deisobutanizer, a partial or total depropanizer, or a debutanizer. And, furthermore, while this invention has been related to the treatment of the alkylate fraction from the primary fractionator, it is within the contemplation of the invention to similarly defluorinate a fraction containing organic compounds recovered from any fractionator.

While preferred embodiments of this invention have been disclosed, the description is intended to be illustrative only and it is to be understood that changes and variations can be made without departing from the spirit and scope of the invention as defined by the appended claims.

We claim:

1. A process which comprises introducing effluent from the conversion of hydrocarbon with hydrofluoric acid catalyst to a fractionation zone, separating in said fractionation zone a liquid hydrocarbon fraction containing organic fluorine compounds, passing at least a portion of said fraction through a heating zone wherein the temperature of said fraction is increased sufficiently to decompose said fluorine compounds and to impart to said fraction a quantity of heat above that required in said fractionating zone, cooling at least a portion of said heated fraction by heat exchange with a fraction from a second fractionation zone, and returning cooled and uncooled hydrocarbon to said first fractionation zone.

2. A process according to claim 1 wherein said effluent is effluent from the alkylation of alkylatable hydrocarbon with an alkylating agent.

3. A process according to claim 2 wherein the alkylatable hydrocarbon is a low boiling olefin and the alkylating agent is a low boiling isoparaffin.

4. A process which comprises introducing effluent from the conversion of hydrocarbon with hydrofluoric acid catalyst to a first fractionation zone, removing from a lower portion of said zone a liquid hydrocarbon fraction containing organic fluorine compounds, passing said fraction through a fired heating zone wherein the temperature is increased to decompose said organic fluorine compounds and to impart to said fraction a quantity of heat above that required in said fractionation zone, returning at least a portion of said heated fraction to said first fractionation zone, withdrawing a second liquid hydrocarbon fraction from the lower portion of said first fractionation zone, passing said second fraction to a second fractionation zone wherein a further separation of hydrocarbons is made, withdrawing a hydrocarbon fraction of lower boiling range than said first and said second hydrocarbon fraction from an intermediate portion of said first zone and introducing same to said second zone.

5. A process according to claim 4 wherein said effluent is effluent from the alkylation of an alkylatable hydrocarbon with an alkylating agent.

6. A process according to claim 5 wherein said hydrocarbon is a low boiling olefin and said alkylating agent is a low boiling isoparaffin.

7. A process which comprises introducing hydrocarbon effluent from the alkylation of a low boiling olefin with isobutane in the presence of hydrofluoric acid catalyst to a first fractionation zone wherein materials lower boiling than isobutane and isobutane are separated overhead, removing from a lower portion of said first zone an at least partially deisobutanized high boiling hydrocarbon fraction containing organic fluorine compounds, passing said fraction to a fired heating zone wherein the temperature is increased to a temperature within the range of about 325 to 550° F. to decompose said organic fluorine compounds and to impart to said fraction a quantity of heat above that required in said first fractionation zone, returning at least a portion of said heated fraction to said first fractionation zone, removing from a lower portion of said first fractionation zone another stream of said partially deisobutanized fraction, introducing said second fraction to a second fractionation zone wherein a further separation of hydrocarbons is carried out, withdrawing from an intermediate portion of said first zone a normal butane-containing hydrocarbon fraction and introducing same into said second zone.

8. A process which comprises introducing hydrocarbon effluent from the alkylation of an alkylatable hydrocarbon with an alkylating agent in the presence of hydrofluoric acid catalyst to a first fractionation zone, separating from said first zone a liquid hydrocarbon fraction containing organic fluorine compounds, passing at least a portion of said fraction to a heating zone wherein the temperature is increased to decompose said organic fluorine compounds and to impart to said fraction a quantity of heat above that required in said first zone, dividing the heated hydrocarbon stream removed from said heating zone, returning a portion of said heated stream to said first zone, passing the remainder of said stream in heat exchange with hydrocarbons of lower temperature contained in a second fractionation zone, thereafter returning the remainder of said hydrocarbon now reduced in temperature to said first zone, and withdrawing from an intermediate portion of said first zone a hydrocarbon fraction having a lower boiling range than said liquid hydrocarbon fraction.

9. A process which comprises introducing hydrocarbon effluent from the alkylation of alkylatable hydrocarbon with an alkylating agent in the presence of hydrofluoric acid catalyst to a first fractionation zone, removing from a lower portion of said first zone a liquid hydrocarbon fraction containing organic fluorine compounds, passing at least a portion of said fraction to a fired heating zone wherein the temperature is increased to decompose said organic fluorine compounds and to impart to said fraction a quantity of heat above that required in said first zone, dividing the heated hydrocarbon stream removed from said heating zone, returning a portion of said heated stream directly to a lower portion of said first zone, passing the remainder of said heated stream in indirect heat exchange with hydrocarbons of lower temperature contained in the lower portion of a second fractionation zone, thereafter returning the remainder of the heated hydrocarbon stream now reduced in temperature to a lower portion of said first zone, and withdrawing from an intermediate portion of said first zone a hydrocarbon fraction having lower boiling range than said liquid hydrocarbon fraction.

10. The process of claim 9 wherein said alkylatable hydrocarbon is a low boiling olefin, said alkylating agent is isobutane, and said intermediate fraction is normal butane.

11. A process which comprises introducing hydrocarbon effluent from the alkylation of a low boiling olefin with isobutane in the presence of hydrofluoric acid catalyst to a first fractionation zone wherein hydrocarbons lower boiling than isobutane are separated, passing the bottoms from said first zone to a second fractionation zone wherein a further separation of hydrocarbons is effected, removing materials lower boiling than isobutane and isobutane overhead from said second zone, removing from a lower portion of said second zone a liquid hydrocarbon fraction containing organic fluorine compounds, passing at least a portion of said liquid fraction through a fired heating zone wherein the temperature is increased to decompose said organic fluorine compounds, dividing the heated hydrocarbon stream removed from said heating zone, returning a portion of said heated stream directly to a lower portion of said second zone, passing the remainder of said heated stream in indirect heat exchange with hydrocarbons of lower temperature contained in the lower portion of said first fractionation zone, thereafter returning the remainder of said stream now reduced in temperature to a lower portion of said second zone, and withdrawing a vaporous normal butane containing fraction from an intermediate portion of said second zone and passing same to a third fractionation zone along with the remainder of said liquid hydrocarbon fraction not passed through said heating zone.

12. A process which comprises introducing hydrocarbon effluent from the alkylation of a low boiling olefin with isobutane in the presence of hydrofluoric acid catalyst to a first fractionation zone wherein materials lower boiling than normal butane are separated overhead, removing from the lower portion of said first zone a liquid hydrocarbon fraction containing organic fluorine compounds, passing at least a portion of said fraction to a fired heating zone wherein the temperature is increased to a temperature within the range of about 325 to about 550° F. to decompose said organic fluorine compounds, dividing said heated hydrocarbon stream removed from said heating zone, returning a portion of said heated stream directly to a lower portion of said first zone, passing the remainder of said heated stream in indirect heat exchange with hydrocarbons contained in the lower portion of a second fractionation zone, thereafter returning the remainder of said heated stream now reduced in temperature to a lower portion of said first zone, withdrawing a vaporous normal butane-containing fraction from an intermediate portion of said first zone and passing same to said second zone, passing the remainder of said hydrocarbon fraction not subjected to heat in said heating zone to said second zone, withdrawing normal butane and lower boiling materials overhead from said second zone, and withdrawing alkylate as bottoms from said second zone and cooling same by said indirect heat exchange.

13. A process for the thermal defluorination of an HF alkylation effluent which is being subjected to deisobutanization, comprising, in combination, the steps of removing an at least partially deisobutanized fraction from a deisobutanization zone, passing said fraction to a heating zone, in said heating zone heating said fraction to a constant heating zone effluent temperature suitable for defluorination of said fraction, returning said thus heated fraction to said deisobutanization zone, and maintaining a constant temperature within said desobutanization zone by controlling the rate of flow of said fraction from said deisobutanization zone to said heating zone and back to said fractionation zone and controlling the amount of vapor withdrawn from an intermediate portion of said deisobutanization zone responsive to the temperature in said zone.

References Cited in the file of this patent

UNITED STATES PATENTS

| | | |
|---|---|---|
| 1,882,568 | Hall | Oct. 11, 1932 |
| 2,220,009 | Youker | Oct. 29, 1940 |
| 2,342,364 | Parker | Feb. 22, 1944 |
| 2,397,085 | Boedeker et al. | Mar. 26, 1946 |
| 2,759,032 | Dixon | Aug. 14, 1956 |
| 2,974,182 | Van Pool | Mar. 7, 1961 |